United States Patent
Wang et al.

(10) Patent No.: US 9,693,372 B2
(45) Date of Patent: Jun. 27, 2017

(54) EMBMS CONTROL PLANE SYNCHRONIZATION

(75) Inventors: Xiaoling Wang, Sollentuna (SE); Ingrid Nordstrand, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 14/412,861

(22) PCT Filed: Jul. 3, 2012

(86) PCT No.: PCT/SE2012/050766
§ 371 (c)(1),
(2), (4) Date: Aug. 11, 2015

(87) PCT Pub. No.: WO2014/007692
PCT Pub. Date: Jan. 9, 2014

(65) Prior Publication Data
US 2015/0359011 A1    Dec. 10, 2015

(51) Int. Cl.
*H04W 24/04* (2009.01)
*H04W 76/00* (2009.01)
*H04W 72/00* (2009.01)
*H04W 84/04* (2009.01)

(52) U.S. Cl.
CPC ....... *H04W 76/002* (2013.01); *H04W 72/005* (2013.01); *H04W 84/04* (2013.01)

(58) Field of Classification Search
None
See application file for complete search history.

(56) References Cited

U.S. PATENT DOCUMENTS

| 2010/0265867 | A1* | 10/2010 | Becker | H04W 72/005 370/312 |
| 2011/0149827 | A1* | 6/2011 | Na | H04L 12/189 370/312 |
| 2012/0202493 | A1* | 8/2012 | Wang | H04W 60/00 455/435.1 |
| 2012/0236776 | A1* | 9/2012 | Zhang | H04W 48/12 370/312 |

(Continued)

OTHER PUBLICATIONS

Alcatel-Lucent, et al., Correction of MCCH Update synchronization Mechanism, 3GPP TSG-RAN WG3 Meting #74, Change Request 36.444 CR 0025 Rev 4, V10.2.0, R3-113166, San Francisco, UA, Nov. 14-18, 2011.

(Continued)

*Primary Examiner* — Hassan Phillips
*Assistant Examiner* — Duc Duong (57) ABSTRACT

The embodiments herein relate to a method in an eNB for handling MBSFN area configuration information. The eNB receives, from a MME, a MBMS session start request. Based on the received request, the eNB computes a first time for a start of the MBMS session. The first time is a first MCC, update time. The eNB periodically sends, from the first time, the configuration information to a user equipment. The eNB stops the sending of the configuration information to the user equipment when the MBMS session is a last MBMS session. The eNB sends updated configuration information to the user equipment when the MBMS session is not the last MBMS session. The updated configuration information is updated MBSFN area configuration information.

24 Claims, 9 Drawing Sheets

(56) References Cited

U.S. PATENT DOCUMENTS

| | | | | |
|---|---|---|---|---|
| 2013/0170357 A1* | 7/2013 | Anchan | ............... | H04L 65/4076 |
| | | | | 370/237 |
| 2013/0215761 A1* | 8/2013 | Xu | ....................... | H04W 24/08 |
| | | | | 370/241 |
| 2013/0223322 A1* | 8/2013 | Ode | ..................... | H04W 16/14 |
| | | | | 370/312 |
| 2013/0286926 A1* | 10/2013 | Zhang | ................... | H04W 56/00 |
| | | | | 370/312 |
| 2014/0071878 A1* | 3/2014 | Xu | ....................... | H04L 12/189 |
| | | | | 370/312 |
| 2014/0192701 A1* | 7/2014 | Drev | ...................... | H04W 4/06 |
| | | | | 370/312 |

OTHER PUBLICATIONS

3GPP TS 36.300, V10.4.0 3rd Generation Partnership Project; Technical Specification Group Radio Access Network; Evolved Universal Terrestrial Radio Access (E-Utra) and Evolved Universal Terrestrial Radio Access Network (E-UTRAN); Overall description; Stage 2 (Release 10), Jun. 2011.

3GPP TS 23.246, V11.1.0 3rd Generation Partnership Project; Technical Specification Group Services and System Aspects; Multimedia Broadcast/Multicast Service (MBMS); Architecture and functional description (Release 11), Mar. 2012.

ETSI TS 136.331 V9.8.0, ETSI Technical Specification LTE: Evolved Universal Terrestrial Radio Access (E-UTRA); Radio Resource Control (RRC); Protocol specification, Nov. 2011.

3GPP TS 36.444, V11.0.0 3rd Generation Partnership Project; Technical Specification Group Radio Access Network; Evolved Universal Terrestrial Radio Access Network (E-UTRAN); M3 Application Protocol (M3AP) (Release 11), Dec. 2011.

* cited by examiner

Fig. 1: Standalone MCE

Fig. 2: Distributed MCE

Fig. 3 MCCH Update time and MCCH modification Period

Fig. 6: eMBMS notification

EMBMS CONTROL PLANE SYNCHRONIZATION

This application is a 371 of PCT/SE2012/050766, filed Jul. 3, 2012, the disclosure of which is fully incorporated herein by reference.

TECHNICAL FIELD

Embodiments herein relate generally to an evolved NodeB (eNB) and a method in the eNB. More particularly the embodiments herein relate to handling configuration information.

BACKGROUND

In a typical cellular network, also referred to as a wireless communication system, a User Equipment (UE), communicates via a Radio Access Network (RAN) to one or more Core Networks (CNs).

A user equipment is a device by which a subscriber may access services offered by an operators network and services outside the operator's network to which the operator's radio access network and core network provide access, e.g. access to the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, hand held, computer comprised, or vehicle mounted mobile devices, enabled to communicate voice and/or data, via the radio access network, with another entity, such as another user equipment or a server.

User equipments are enabled to communicate wirelessly with the communications network. The communication may be performed e.g. between two user equipments, between a user equipment and a regular telephone and/or between the user equipment and a server via the radio access network and possibly one or more core networks, and possibly the Internet.

The radio access network covers a geographical area which may be divided into cell areas, with each cell area being served by a base station, e.g. a Radio Base Station (RBS), which in some radio access networks is also called eNB, NodeB, B node or base station. A cell is a geographical area where radio coverage is provided by the base station at a base station site. The base stations communicate over the air interface with the user equipments within range of the base stations. In the following, the term eNB is used when referring to the base station.

Multimedia Broadcast and Multicast Services (MBMS) is a broadcasting service offered via cellular networks. The MBMS is a point-to-multipoint service in which data is transmitted from a single source entity to multiple recipients. The MBMS service may be used for file download and for streaming type of services, e.g. "Mobile TV".

Enhanced MBMS (eMBMS) is an enhanced version of MBMS and it is used to denominate MBMS service in Evolved Packet Systems (EPS) including E-UTRAN (LTE) and UTRAN access. E-UTRAN is short for Evolved UMTS Terrestrial Radio Access Network, UMTS is short for Universal Mobile Telecommunications System, LTE is short for Long Term Evolution and UTRAN is short for Universal Terrestrial Radio Access Network. eMBMS was included in the Third Generation Partnership Project (3GPP) release 9 specifications. eMBMS is related to broadcasting of content to multiple users equipments simultaneously, utilizing LTE networks. eMBMS may for example be particularly useful during live events, such as music concerts or sports events, where millions of consumers are simultaneously viewing the same content, and where eMBMS may be used to broadcast complementary content, like different camera angels for instance, to LTE user equipments. eMBMS enables operators to make better use of their available spectrum and free up network capacity. Thus, the operators may maximize efficiency when offering services such as live TV, video on demand, podcasts etc.

One concept in eMBMS is the MBSFN transmission. MBSFN is an MBMS Single Frequency Network. A MBSFN area comprises multiple cells in which transmission of identical waveforms is performed at the same time. A property of MBSFN transmission is that all participating cells transmit exactly the same content in a synchronized manner so it appears as one transmission to the user equipment. This gives the possibility for user equipments to combine MBMS transmissions from multiple cells. Transmitting the same data to multiple user equipments allows network resources to be shared. Mechanisms are therefore provided to ensure synchronization of the MBMS content—i.e. to ensure that all participating eNBs include the same MBMS control information and data in the corresponding time-synchronized subframe.

To achieve the MBSFN transmission, the following synchronizations are needed:

Network synchronization

MBMS User Data flow synchronization

MBMS control plane synchronization (also called MCCH Update Signaling synchronization)

MCCH is short for Multicast Control Channel and is a point-to-multipoint downlink channel used for transmitting MBMS control information from the eNB to the user equipment. This channel is only used by user equipments that receive MBMS.

The eMBMS is realized in the 3GPP specifications by the addition of a number of new capabilities to existing functional entities of the 3GPP architecture and by addition of a new functional entity, a Multi-cell/multicast Coordination Entity (MCE).

According to 3GPP, there are two eMBMS deployment alternatives:

Alternative 1: Standalone MCE, see FIG. 1.

Alternative 2: Distributed MCE, see FIG. 2.

Figure 1:
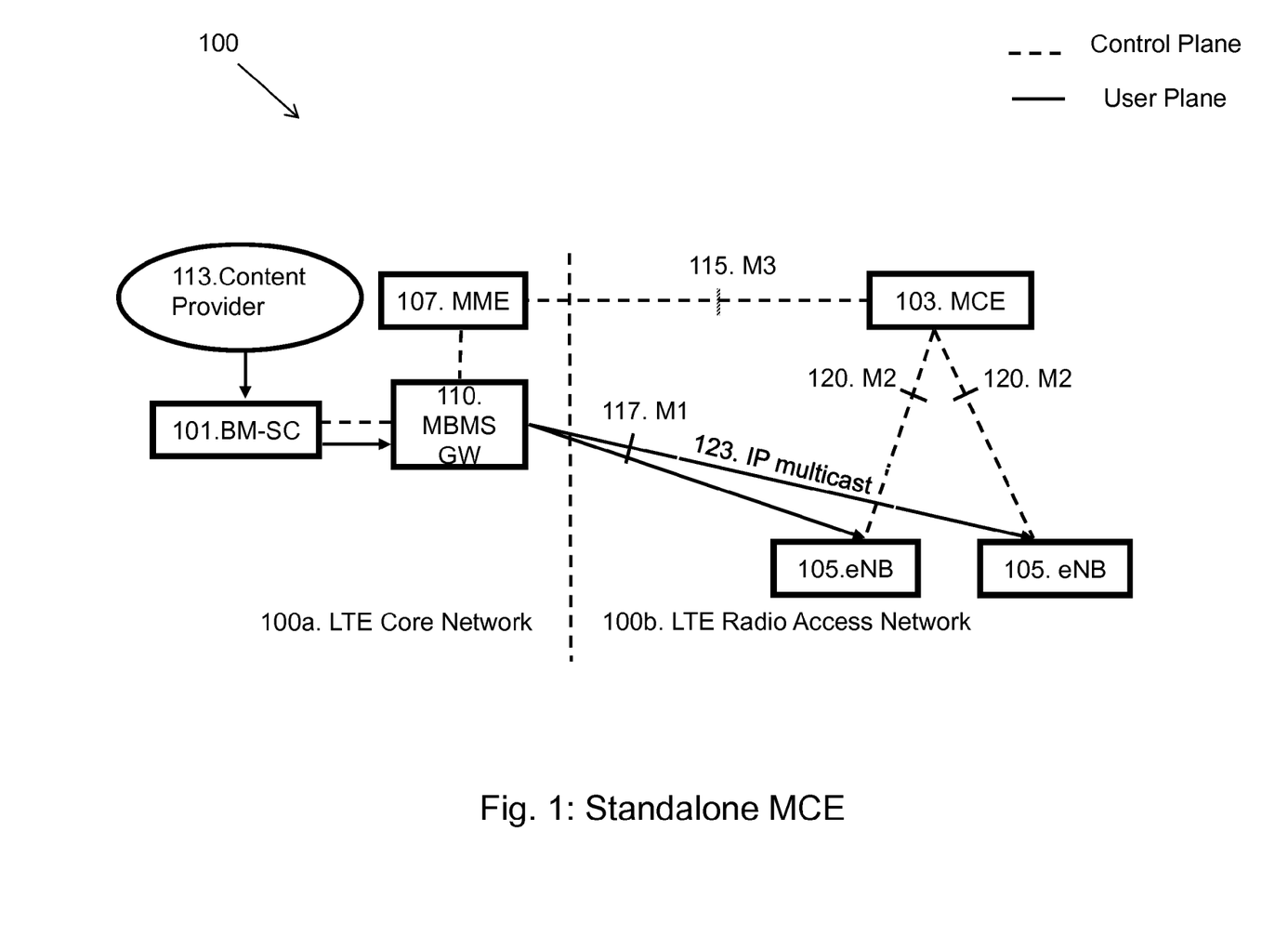
FIG. 1 is a schematic block diagram illustrating embodiments of a communications network with a standalone MCE.

Alternative 1 with the standalone MCE will now be described with reference to FIG. 1. FIG. 1 is an illustration of the eMBMS logical architecture of a communications network 100 with a standalone MCE. The communications network 100 comprises a LTE core network 100a and a LTE radio access network 100b.

The Broadcast Multicast Service Center (BM-SC) 101 is an entity which controls MBMS sessions and corresponding MBMS bearers.

In this figure, the MCE 103 is a logical standalone entity. The functions of the MCE 103 are the admission control and the allocation of radio resources used by all eNBs 105 in the MBSFN area. The standalone MCE 103 is involved in MBMS Session Control Signaling. The standalone MCE 103 decides when eNBs 105 perform MCCH update signaling to user equipments (not shown). Accordingly, the MCCH update signaling synchronization may be achieved.

Only two eNBs 105 are shown in FIG. 1 for the sake of simplicity, but the skilled person will understand that more than two eNBs 105 may also be comprised in the communications network 100.

The Mobility Management Entity (MME) 107 is a control node in the communications network 100.

MBMS GateWay (MBMS GW) 110, is an entity that is present between the BM-SC 101 and eNBs 105 whose functions is the sending/broadcasting of MBMS packets to each eNB 105 transmitting the service. The MBMS GW 110 performs MBMS Session Control Signaling (Session start/stop) towards the E-UTRAN via the MME 107.

The content provider 113 provides eMBMS services to the communications network 100.

The M3 115 is the interface between the MCE 103 and the MME 107, and is a control plane interface as indicated by the dotted line. M1 117 is the interface between the MBMS GW 110 and the eNBs 105, and is a user plane interface as indicated by the continuous line. M2 120 is a control plane interface between the MCE 103 and the eNBs 105. IP multicast 123 is used for point-to-multipoint delivery of user packets from the MBMS GW 110 to the eNBs 105.

Figure 2:
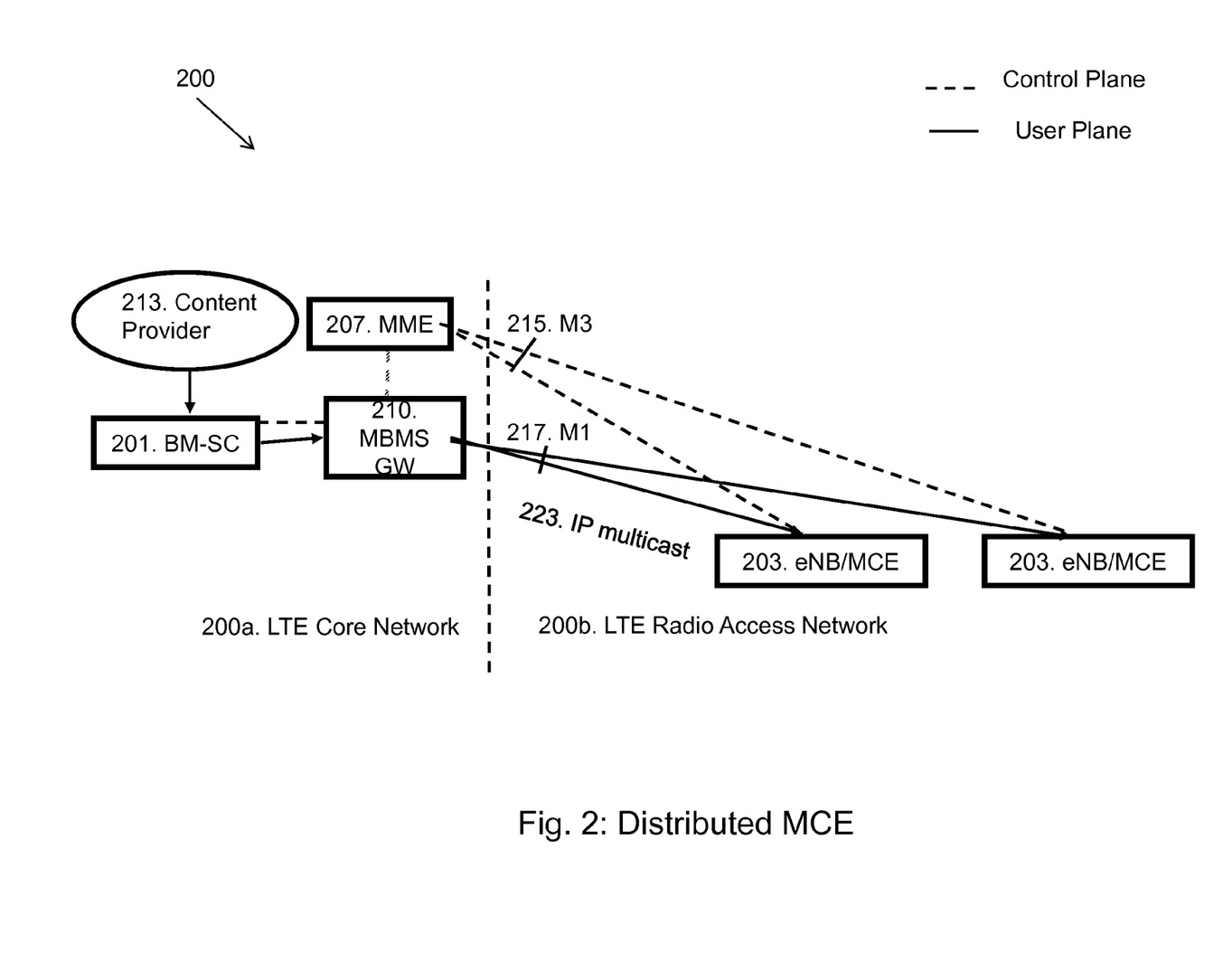
FIG. 2 is a schematic block diagram illustrating embodiments of a communications network with a distributed MCE.

Alternative 2 with the distributed MCE will now be described with reference to FIG. 2. FIG. 2 is an illustration of the eMBMS logical architecture of a communications network 200 with a distributed MCE. The communications network 200 comprises a LTE core network 200a and a LTE radio access network 200b.

The Broadcast Multicast Service Center (BM-SC) 201 is an entity which controls MBMS sessions and corresponding MBMS bearers.

In this FIG. 2, the MCE is a distributed entity which is a part of another network element, i.e. the eNB. In FIG. 2, the combined MCE and eNB is referred to as an eNB/MCE 203.

The Mobility Management Entity (MME) 207 is a control node in the communications network 200.

MBMS GW 210 is an entity that is present between the BM-SC 201 and eNB/MCE 203 whose functions is the sending/broadcasting of MBMS packets to each eNB/MCE 203 transmitting the service. The MBMS GW 210 performs MBMS Session Control Signaling (Session start/stop) towards the E-UTRAN via the MME 207.

The content provider 213 provides eMBMS services to the communications network 200.

The M3 215 is the interface between the MCE part of the eNB/MCE 203 and the MME 207, and is a control plane interface as indicated by the dotted line. Thus, the architecture in FIG. 2 may be referred to as being a M3 based architecture. M1 217 is the interface between the MBMS GW 210 and the eNB part of the eNB/MCE 203 and is a user plane interface as indicated by the continuous line. IP multicast 223 is used for point-to-multipoint delivery of user packets.

Figure 3:
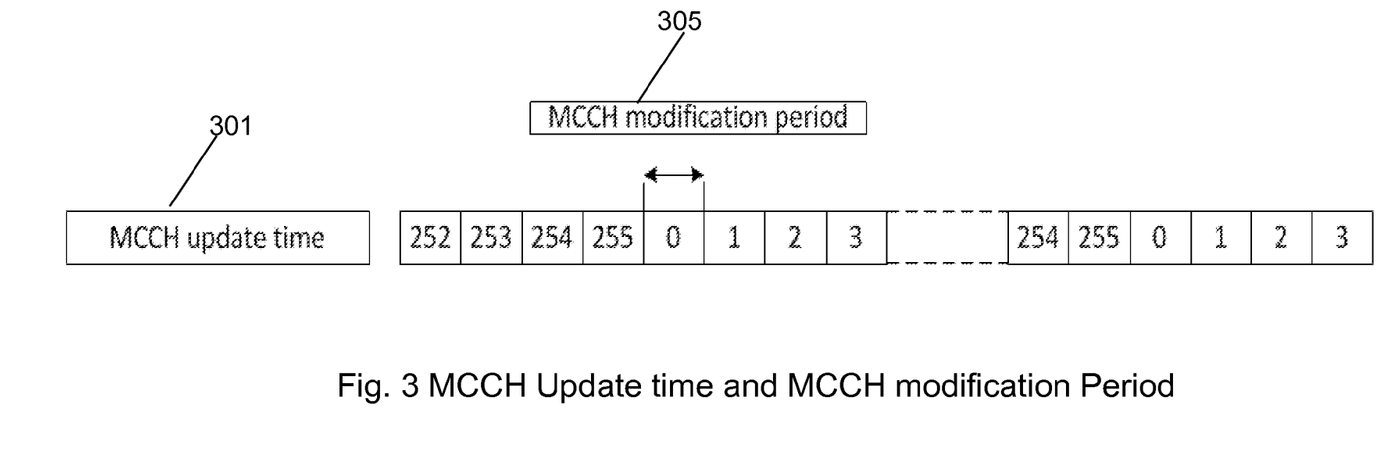
FIG. 3 is a schematic block diagram illustrating embodiments of the MCCH update time and MCCH modification period.

For the MBMS control information, whenever the standalone MCE 103, see FIG. 1, updates the control information it indicates the modification period from which the updated control information applies by means of a parameter called MCCH update time, as illustrated in FIG. 3. The MCCH update time 301 and the MCCH modification period 305 is indicated in FIG. 3. This concept is used in the standalone MCE architecture to synchronize control plane signaling: MCCH update signaling for all eNBs 105 by sending the same MCCH update time 301 to all eNBs 105. Hence, the synchronization of the MCCH update signaling for all eNBs 105 may be achieved. The range of the MCCH update time 301 is 255.

The 3GPP standard supports control plane synchronization for the distributed MCE architecture by including the parameters "Time of MBMS Data Transfer" and "Time of MBMS Data Stop" in the MBMS session start request and the MBMS session stop request messages respectively. The "Time of MBMS Data Transfer"/"Time of MBMS Data Stop" is an absolute timestamp which indicates the absolute time of the actual start or stop of the MBMS data transfer. Accordingly, all eNBs/MCE 205 will transfer/stop user data at the same time.

In the case of distributed MCEs where the MCE is co-allocated in the eNB 203, achieving the MCCH update signaling synchronization is not completely supported by the current standard.

SUMMARY

An object of embodiments herein is therefore to obviate at least one of the above disadvantages and to provide improved eMBMS.

According to a first aspect, the object is achieved by a method in an eNB for handling configuration information. The configuration information is an MBSFN area configuration information. The eNB receives, from a MME, a MBMS session start request. Based on the received request, the eNB computes a first time for a start of the MBMS session. The first time is a first MCCH update time. The eNB periodically sends, from the first time, the configuration information to a user equipment. The eNB stops the sending of the configuration information to the user equipment when the MBMS session is a last MBMS session. The eNB sends updated configuration information to the user equipment if the MBMS session is not the last MBMS session. The updated configuration information is updated MBSFN area configuration information.

According to a second aspect, the object is achieved by the eNB for handling configuration information. The configuration information is the MBSFN area configuration information. The eNB comprises a receiver which is configured to receive, from the MME, the MBMS session start request. The eNB comprises a processor configured to, based on the received request, compute the first time for the start of the MBMS session. The first time is the first MCCH update time. The eNB comprises a transmitter configured to periodically send, from the first time, configuration information to the user equipment. The transmitter is configured to stop the sending of the configuration information to the user equipment when the MBMS session is a last MBMS session, and to send updated configuration information to the user equipment when the MBMS session is not the last MBMS session. The updated configuration information is the updated MBSFN area configuration information.

Embodiments herein afford many advantages, of which a non-exhaustive list of examples follows:

An advantage of the embodiments herein is that they provide a simple way to ensure that all eNBs in the communications network will achieve synchronization of MCCH update signaling for a distributed MCE architecture.

Another advantage of the embodiments herein is that calculating the MCCH Update time may also be used for the standalone MCE architecture.

Another advantage of the embodiments herein is that they provide a method for the eNB/MCE to cleanup the MBMS session in a synchronized way.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to synchronizing the MCCH update signaling for distributed MCE.

Figure 4:
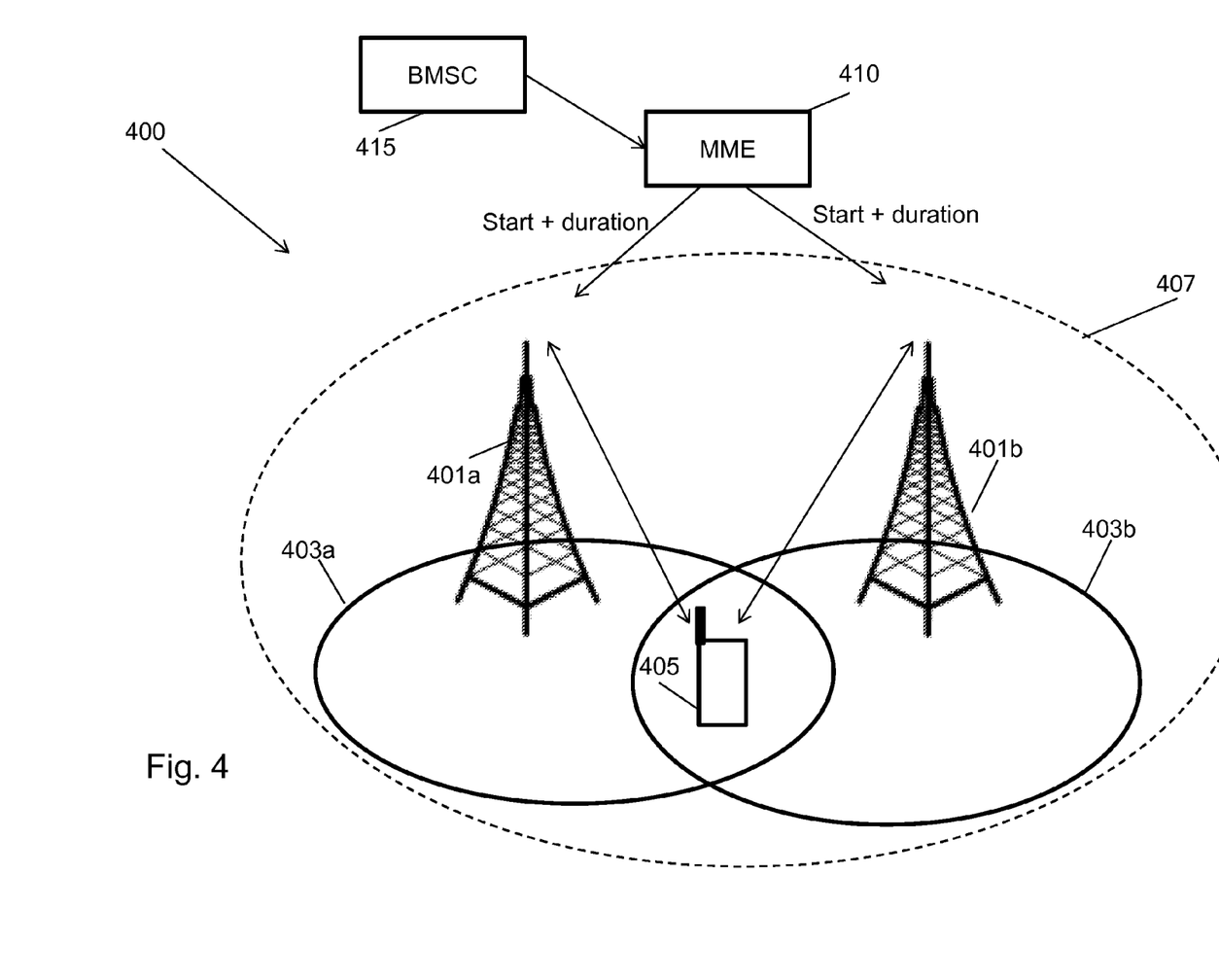
FIG. 4 is a schematic block diagram illustrating embodiments of a communications network.

FIG. 4 depicts a communications network 400 in which embodiments herein may be implemented. The communications network 400 applies to a radio access technology such as LTE.

The wireless communications network 400 comprises a first eNB 401a serving a first cell 403a and is an entity capable to communicate over a radio carrier with a user equipment 405 being present in the first cell 403a. The user equipment 405 supports MBMS and/or eMBMS. The first eNB 401a comprises a MCE (not shown).

The wireless communications network 400 comprises a second eNB 401b serving a second cell 403b and is a unit that is capable to communicate over a radio carrier with the user equipment 405 being present in the second cell 403b. The second eNB 401b comprises a MCE (not shown).

When the user equipment 405 is moving for example from the first cell 403a to the second cell 403b, the user equipment 405 will at some point be in an overlapping area between the first cell 403a and the second cell 403b. In this overlapping area, the user equipment 405 may be communicating with both the first eNB 401a and the second eNB 401b.

The user equipment 405 may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC. The user equipment 405 is referred to as UE in some of the figures.

The first cell 403a and the second cell 403b are comprised in a MBSFN area 407.

The communications network 400 further comprises a MME 410 which transmits control plane signaling to the first eNB 401a and the second eNB 401b. The control plane signaling may be for example a MBMS session start request comprising a time of MBMS data transfer. The MBMS GW 415 performs MBMS Session Control Signaling (Session start/stop) towards the first eNB 401a and the second eNB 403b via the MME 410.

The method for handling configuration information according to some embodiments will now be described with reference to the signalling diagram depicted in FIG. 5. In the following, the reference number 401 will be used when referring to an eNB in general, independent of whether it is the first eNB or the second eNB. The method comprises the following steps, which steps may as well be carried out in another suitable order than described below.

Step 501

The MME 410 sends a MBMS session start request to the eNB 401. The MBMS session start request comprises attributes for the MBMS session, such as for example a parameter timeOfMbmsDataTransfer. The session start is a trigger for bearer resource establishment for MBMS data transfer. The MBMS session start request may be an eMBMS session start request.

Step 502

When the eNB 401 receives the MBMS session start request from the MME 410, the eNB 401 computes a first time for start of the MBMS session based on the received MBMS session start request. The first time is a first MCCH update time.

The MCCH updating signal needs to be sent to the user equipment 405 before the actual data transfer for the MBMS session start. While, the MCCH updating signal needs to be sent to user equipment after the actual data transfer for the MBMS session stop.

The way of computing the first MCCH update time is dependent on whether the parameter timeOfMbmsDataTransfer is comprised in the MBMS session start request, or whether the current time is used instead (i.e. the timeOfMbmsDataTransfer is not available).

In order to compute the first MCCH update time (and the second MCCH update time in the step 503), the MCCH modification period needs to be counted. To be able to use the concept of the MCCH update time, the MCCH modification period needs to be numbered in the eNB 401. Hence, the McchModificationPeriodStartTime is needed. MCCH Modification Period defines periodically appearing boundaries, i.e. radio frames for which SFN mod mcchModificationPeriod=0, where the SFN is short for System Frame Number. The MchhModifcationPeriodStartTime may be configured to be the same as the SFN start time. For the Global Positioning System (GPS) synchronized nodes, the SFN starts (was zero) when the GPS started. In example, the GPS time started (was zero) at 1980-01-06 00.00.00, i.e. at midnight between the 5$^{th}$ and 6$^{th}$ of Jan. 1980. The McchModificationPeriod may then be numbered, started at the McchModificationPeriodStartTime.

When the parameter timeOfMbmsDataTransfer was comprised in the MBMS session start request received in step 501, the first MCCH update time for the start of the MBMS session is computed by using the timeOfMbmsDataTransfer, see table 1. This is converted to the time based on the same clock as the mcchMoficationPeriodStartTime uses if they are not the same. The range of McchUpdateTime is 0 . . . 255. The MCCH update signaling is sent at least one MCCH modification period ahead of when the Mbms user data starts to transmit.

odStartTime uses if they are not the same. The range of McchUpdateTime is 0 . . . 255.

When considering a MBMS session life time, the first session start (which is referred to as the first MCCH update time) is based on the TimeOfMbmsDataTransfer according

TABLE 1

First MCCH update time based on timeOfMbmsDataTransfer

| Scenario | Based on | First MCCH update time | Comments |
|---|---|---|---|
| Normal MBMS session start | IE: timeOfMbmsDataTransfer | Int (timeOfMbmsDataTransfer-McchModificationPeriodStartTime)/ McchModficationPeriod-1) MOD 256 | MCCH update signaling is sent at least one MCCH Modification Period ahead of Mbms User data starts to transmit. |

In table 2 below, the scenario where the timeOfMbmsDataTransfer is missing in the MBMS session start request, or where the timeOfMbmsDataTransfer has already passed. In this scenario, the current time is used instead in order to compute the first MCCH update time. The MBMS session starts as soon as possible which is the next available MCCH modification period.

to table 1 or table 2 above. Then the session needs to be stopped. This is called the second MCCH update time. The session may be stopped when the eNB 401 receives a MBMS session stop request. The second MCCH update time may be calculated in different ways, such as exemplified in tables 3, 4 and 5.

TABLE 2

First MCCH update time based on current time

| Scenario | Based on | First MCCH update time | Comments |
|---|---|---|---|
| MBMS session start for distributed MCE: No info about timeOfMbmsDataTransfer unlock cell in MbsfnArea where MBMS session has already started resume MBMS session after MBMS session started | "current" time | (int (("current time"-McchModificationPeriodStartTime)/ McchModfication) +1) MOD 256 | The MBMS session starts as soon as possible which is the next available MCCH modification period |

Step 503

The eNB 401 computes a second time for cleanup or stop of the MBMS session. The computing of the second time is done based on the first time computed in step 502 and based on the timeOfMbmsDataStop, if it is available. If the timeOfMbmsDataStop is not available, the current time may be used instead. The second time is a second MCCH update time. The MBMS session may be an eMBMS session. The MBMS session stop is the point where there will be no more data to send for some period of time. This is converted to the time based on the same clock as the mcchMoficationPeri- The parameter timeOfMbmsDataStop may be comprised in the MBMS session stop request. In one embodiment, the second MCCH update time is calculated by using the parameter timeofMbmsDataStop, see table 3. The term "normal" means here that the timeOfMbmsDataStop has been received in the MBMS session stop request and it does not indicate the time which has already passed. When the timeofMbmsDataStop is used, the MCCH update signaling is sent at least one MCCH Modification Period after the Mbms User data stops to transmit.

TABLE 3

Second MCCH update time based on timeOfMbmsDataStop

| Scenario | Based on | Second MCCH update time | Comments |
|---|---|---|---|
| Normal MBMS session stop | IE: timeOfMbmsDataStop | (int (( timeOfMbmsDataStop-McchModificationPeriodStartTime )/ McchModfication) + 1) MOD 256 | MCCH update signaling is sent at least one MCCH Modification Period after Mbms User data stops to transmit. |

In another embodiment, the second MCCH update time is calculated by using the current time, see table 4. This is referred to as an abnormal case for MBMS session stop, where abnormal refers to that the parameter timeOfMbmsDataStop is not available in the MBMS session stop request. The eNB 401 missed the MBMS session stop request and cleans up the resources after execution of an audit function. The MBMS session stops as soon as possible which is the next available MCCH modification period.

TABLE 4

Second MCCH update time based on current time

| Scenario | Based on | Second MCCH update time | Comments |
|---|---|---|---|
| Abnormal cases for MBMS session stop. No info about timeOfMbmsDataStop Lock MbsfnArea eNB missed MBMS SESSION STOP REQUEST and cleanup resources after audit function | "current" time | (int (("current time"- McchModificationPeriodStartTime)/ McchModfication) + 1) MOD 256 | The MBMS session stops as soon as possible which is the next available MCCH modification period |

In another embodiment, the MBMS session may be stopped by a session duration timeout, see table 5 below. Then the second MCCH update time will be based on the MBMS session duration time and the timeOfMbmsDataTransfer. The MCCH update signaling is sent at least one MCCH Modification Period after the MBMS Session Duration timeout.

TABLE 5

Second MCCH update time when timeout of MBMS session duration

| Scenario | Based on | Second MCCH update time | Comments |
|---|---|---|---|
| MBMS session stop due to timeout for MBMS session duration | IE: timeOfMbmsDataTransfer IE: MBMSsessionDuration | (int ((timeOfMbmsDataTransfer + mbmsSessionDuration )- McchModificationPeriodStartTime )/ McchModfication) + 1) MOD 256 | MCCH update signaling is sent at least one MCCH Modification Period after MBMS Session Duration timeout |

Step 504

The eNB 401 periodically sends, from the first time, configuration information to the user equipment 405. The configuration information is the MBSFN area configuration information. The configuration information is carried by the MCCH. The configuration information indicates the MBMS sessions or eMBMS sessions that are ongoing as well as the (corresponding) radio resource configuration. The scheduling of MCCH information, i.e. the MBSFNAreaConfiguration message, is based on a configured modification period and repetition period. Within a modification period, the same MCCH information may be transmitted a number of times, which is based on the configured repetition period.

Step 505

At the first time, computed in step 502, the MBMS session starts, i.e. when MBMS data is transferred to the user equipment 405. The MBMS session may be for example a TV program. The MBMS session may be an eMBMS session.

Step 506

The eNB 401 checks whether the MBMS session is the last MBMS session or not.

Step 507

If the MBMS session is the last session, the eNB 401 stops the periodical sending of the configuration information to the user equipment and cleans up all the MBMS resources. The stop will take place at the second time, which was computed in step 503.

Step 508

This step is performed instead of step 507. If the MBMS session is not the last session, the eNB 401 sends updated configuration information to the user equipment 405. The updated configuration information is updated MBSFN area configuration information. The configuration information is updated for example because the network has changed at least a part of the configuration information.

Figure 5:
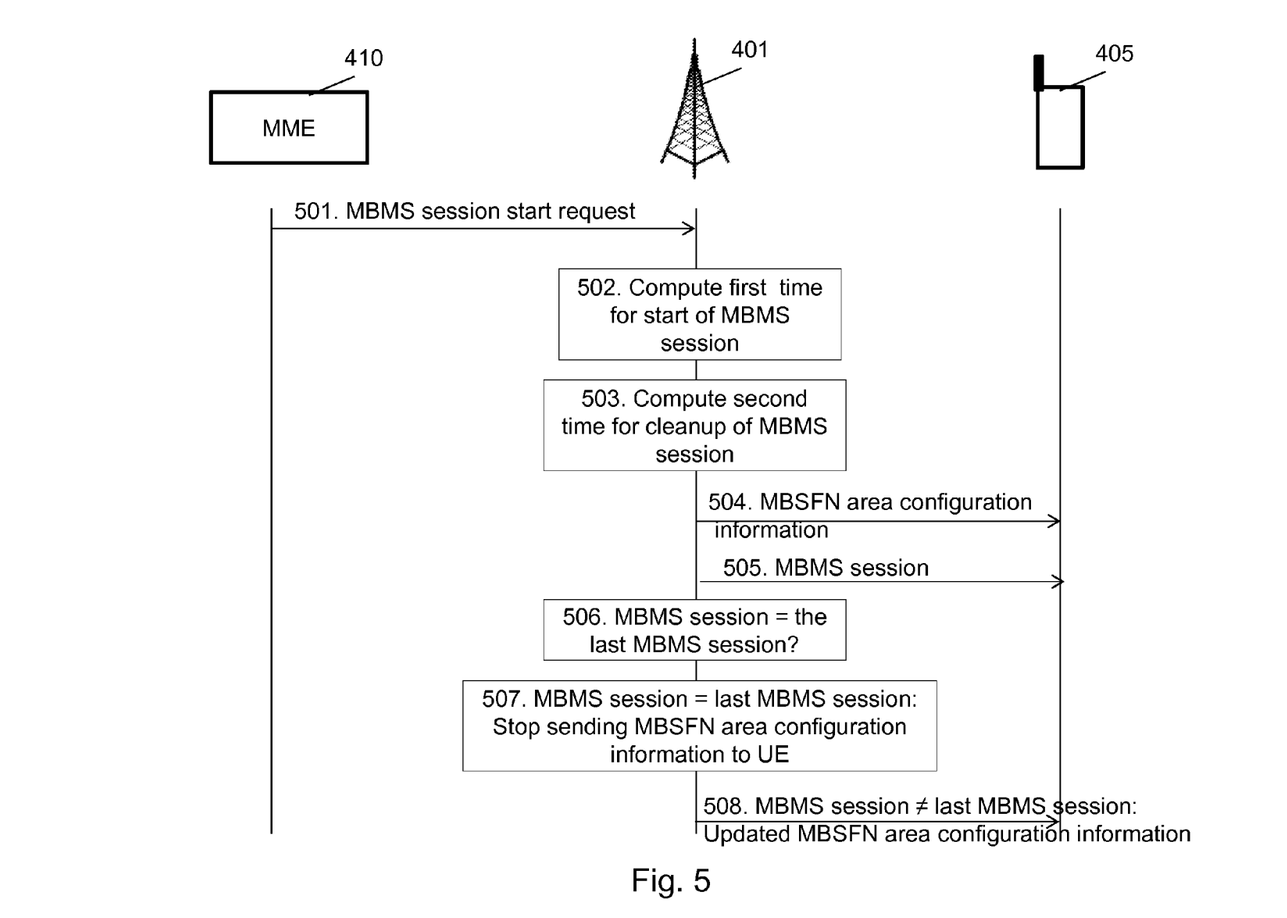
FIG. 5 is a signaling diagram illustrating embodiments of a method.
Figure 6:
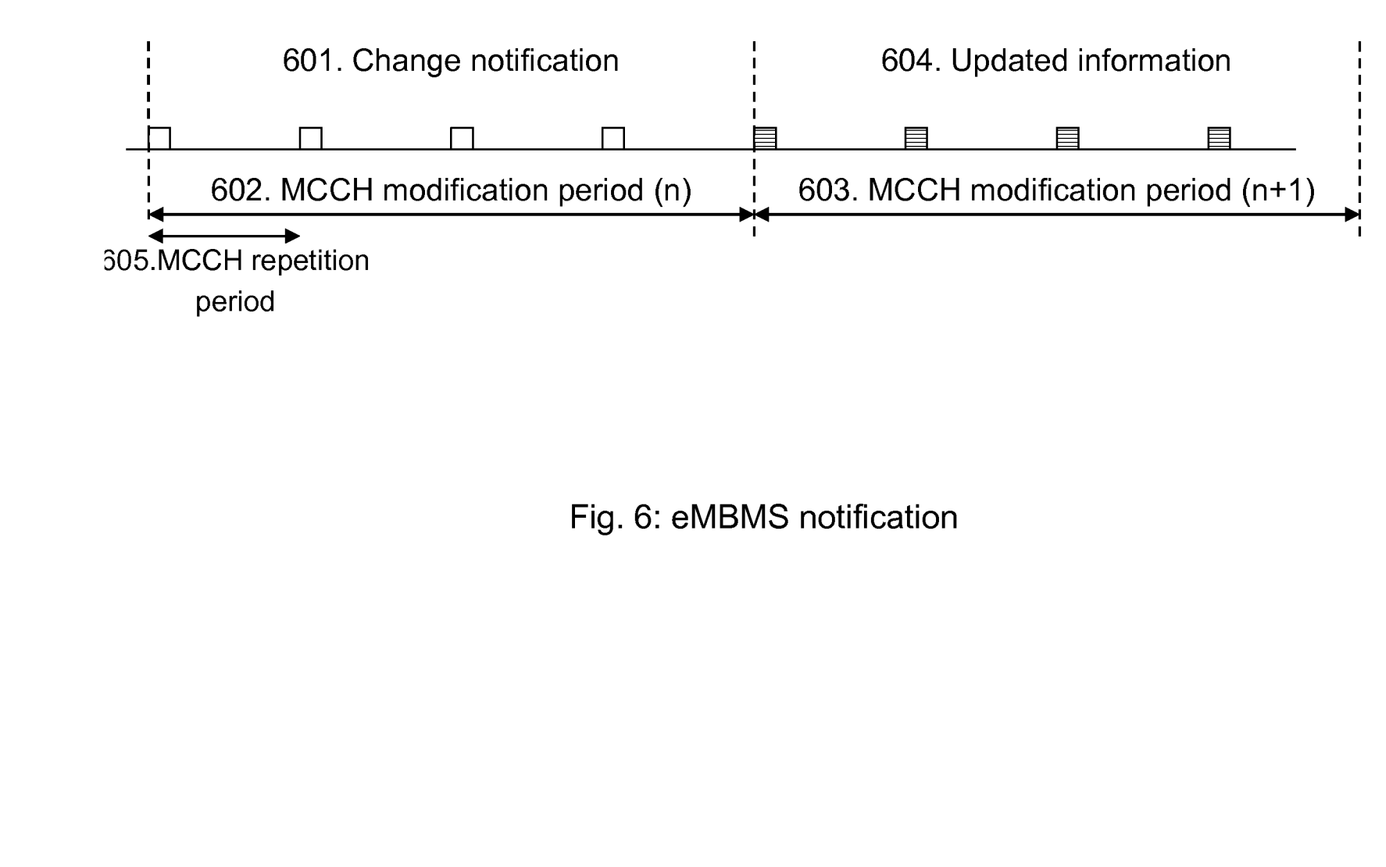
FIG. 6 is a schematic block diagram illustrating embodiments of the eMBMS notification.

FIG. 6 illustrates an eMBMS notification. Change of MCCH information may only occur at the modification period boundaries. When MCCH information is to be changed, the eNB 401 notifies the user equipment 405 about the change by sending a change notification 601 during a first MCCH modification period n 602. This step is not illustrated in FIG. 5. In the next MCCH modification period n+1 603, the eNB 401 transmits the new/updated MCCH information 604. The new/updated MCCH information 604 is the same as the MBSFN area configuration information. The periodical transmission of the configuration is based on the MCCH repetition period 605. As mentioned earlier, the MBSFN area 407 comprises multiple cells in which transmission of identical waveforms is performed at the same time. An MBSFN transmission from multiple cells 403 within the MBSFN area 407 is seen as a single transmission by the user equipment 405. When the MBMS session is started by the MME 410, all cells 403 (in all eNBs 401) in the same MBSFN area 407 need to update this information at the same MCCH modification period. Otherwise, interferences will occur. The same principle will apply to the MBMS session stop, as described in step 507.

With this, the MCCH update time is introduced into all eNBs 401. The MCCH update time is calculated based on the "Time of MBMS Data Transfer/Time of MBMS Data Stop or based on the current time. By using the same method in all eNBs 401, the MCCH update signaling synchronization will be achieved.

Figure 7:
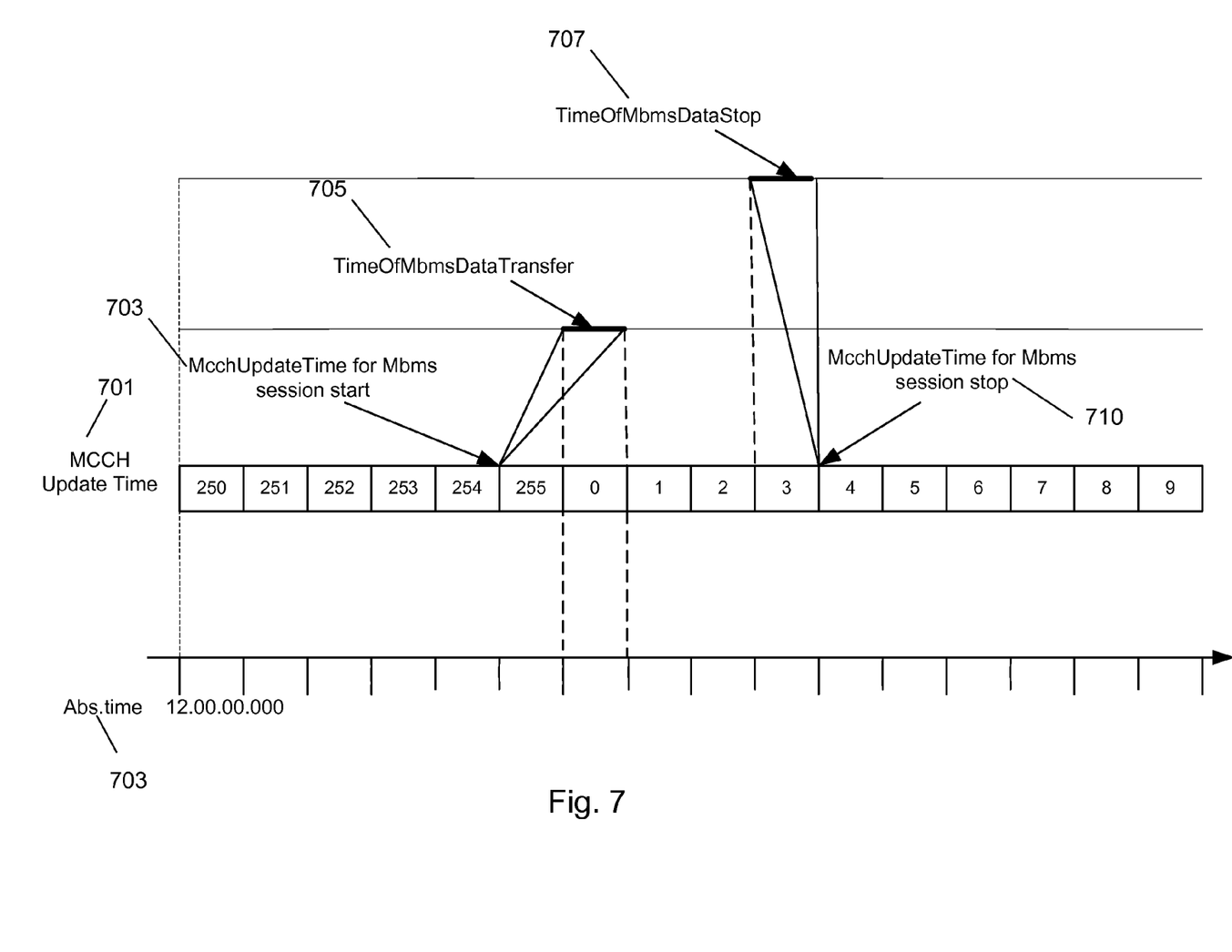
FIG. 7 is a schematic block diagram illustrating embodiments of the MCCH update time.

FIG. 7 illustrates the MCCH Update time for normal MBMS session start request and MBMS session stop request, i.e. when the parameters TimeOfMbmsDataTransfer and timeOfMbmsDataStop are available. The MCCH update time 701 is illustrated in the middle of FIG. 7. The MCCH update time for Mbms session start 703 is 255 in the MCCH update time 701. The TimeOfMbmsDataTransfer 705 takes place somewhere in MCCHUpdateTime=0. The TimeOfMbmsDataStop 707 is somewhere in MCCHUpdateTime=3, and the Mcch Update Time for MBMS session stop 710 is at MCCHUpdateTime=4.

Figure 8:
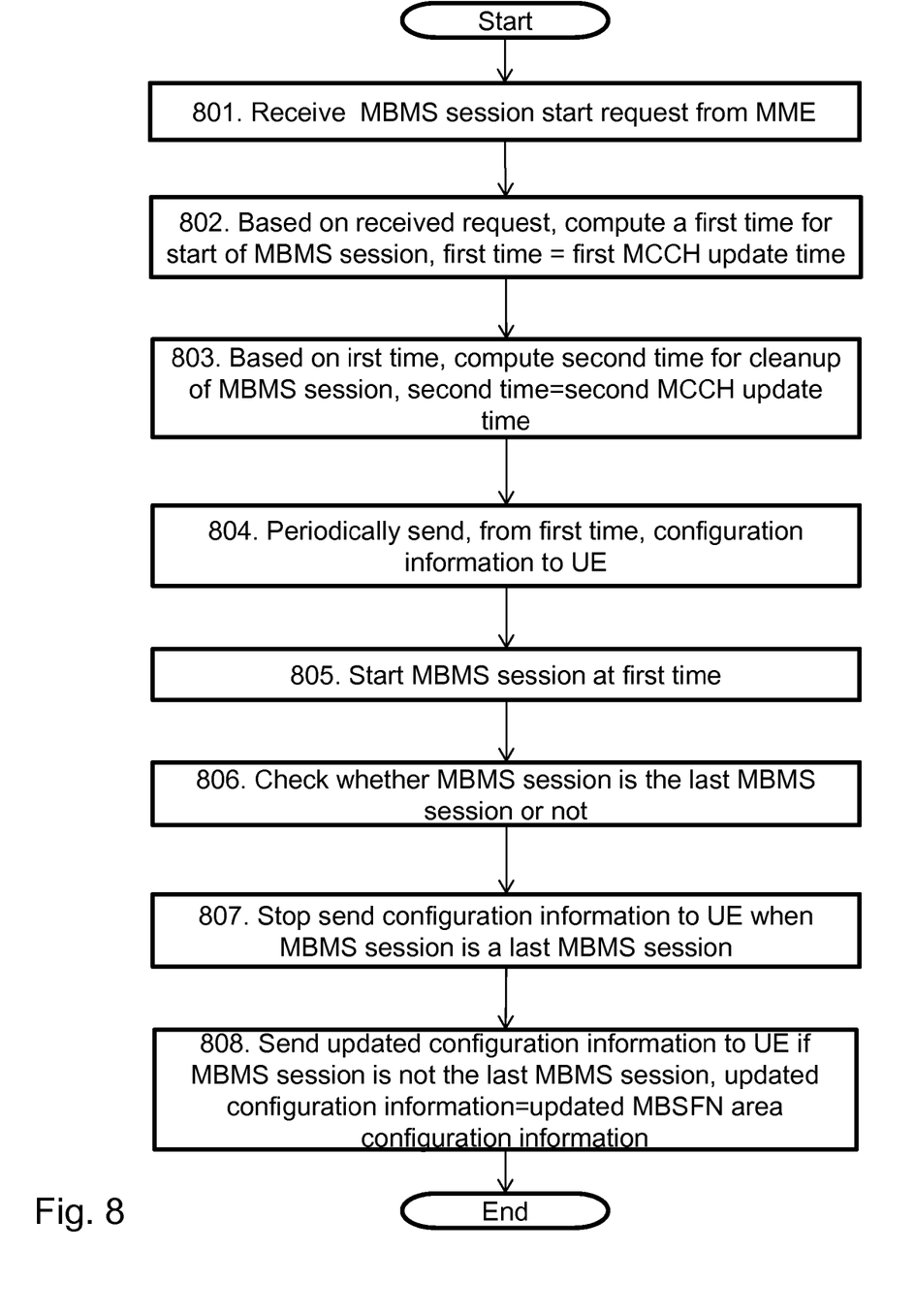
FIG. 8 is a flow chart illustrating embodiments of a method in an eNB.

The method described above will now be described seen from the perspective of the eNB 401. FIG. 8 is a flowchart describing the present method in the eNB 401, for handling configuration information. As mentioned above, the configuration information is the MBSFN area configuration information. In some embodiments, the eNB 401 comprises a MCE, which MCE performs the method described below. The method comprises the further steps to be performed by the eNB 401, which steps may be performed in any suitable order:

Step 801

This step corresponds to step 501 in FIG. 5.

The eNB 401 receives, from the MME 410, the MBMS session start request. The MBMS session start request may comprise a parameter referred to as a time of MBMS data transfer.

In some embodiments, the MBMS session start request is a first MBMS session start request.

The MBMS session may be an eMBMS session.

Step 802

This step corresponds to step 502 in FIG. 5.

Based on the received MBMS session start request, the eNB 401 computes a first time for the start of the MBMS session. The first time is the first MCCH update time.

This is based on table 1 or table 2, depending on the different scenarios or conditions. In some embodiments, when the time of MBMS data transfer was comprised in the MBMS session start request, this parameter is used to compute the first time. In some embodiments, when the time of MBMS data transfer was not comprised in the MBMS session start request, the current time is used to compute the first time.

Step 803

This step corresponds to step 503 in FIG. 5.

In some embodiments, based on the computed first time, the eNB 401 computes a second time for a cleanup or stop of the MBMS session. The second time is a second MCCH update time.

In some embodiments, the second time is computed based on the first time and based on a time of MBMS data stop, see table 3.

In some embodiments, the second time is computed based on the first time and based on a current time, see table 4.

In some embodiments, the second time is computed based on the first time and based on a time of MBMS data transfer and based on a MBMS session duration time, see table 5.

Step 804

This step corresponds to step 504 in FIG. 5.

The eNB 401 periodically sends, from the first time, the configuration information to the user equipment 405.

Step 805

This step corresponds to step 505 in FIG. 5.

In some embodiments, the eNB 401 starts the MBMS session at the first time.

Step 806

This step corresponds to step 506 in FIG. 5.

In some embodiments, the eNB 401 checks whether the MBMS session is the last MBMS session or not.

Step 807

This step corresponds to step 507 in FIG. 5.

The eNB 401 stops the sending of the configuration information to the user equipment 405 when the MBMS session is the last MBMS session. The sending of the configuration information may be stopped at the computed second time.

As mentioned above, the second time may be the second McchUpdateTime and it is based on table 3 or table 4 or table 5.

Step 808

This step corresponds to step 508 in FIG. 5.

The eNB 401 sends updated configuration information to the user equipment 405 if the MBMS session is not the last MBMS session. The updated configuration information is updated MBSFN area configuration information.

Figure 9:
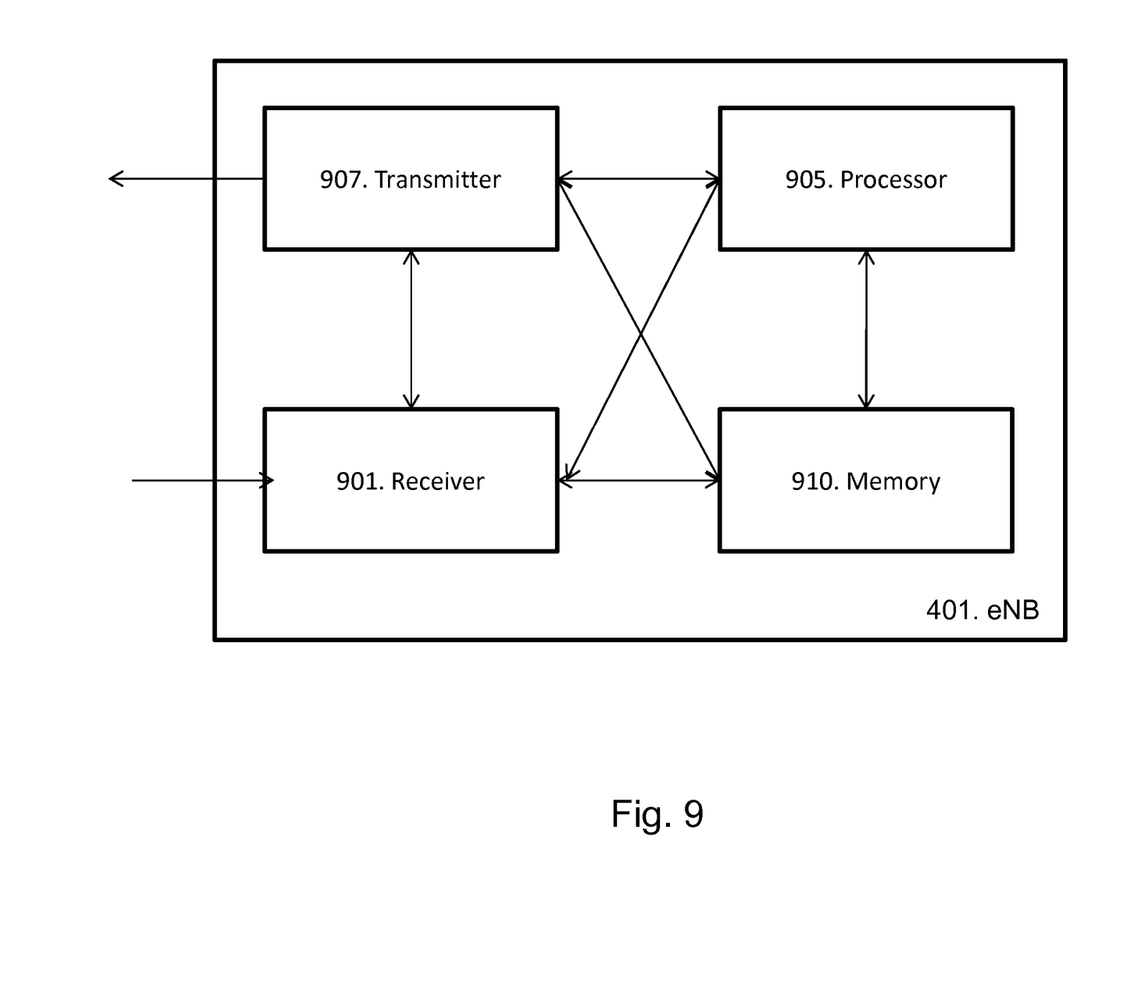
FIG. 9 is a schematic block diagram illustrating embodiments of an eNB.

To perform the method steps shown in FIG. 8 for handling configuration information the eNB 401 comprises an arrangement as shown in FIG. 9. As mentioned above, the configuration information is the MBSFN area configuration information. The eNB 401 may comprise an MCE. The MCE comprises the features of the eNB 401 as described below.

The eNB 401 comprises a receiver 901 configured to receive, from the MME 410, the MBMS session start request. In some embodiments, the MBMS session start request comprises information about a time of MBMS data transfer.

The MBMS session start request may be a first MBMS session start request.

The eNB 401 comprises a processor 905 which is configured to, based on the received request, compute the first time for the start of the MBMS session. The first time is the first MCCH update time. In some embodiments, the first time is computed based on the time of MBMS data transfer, when available. In some embodiment, the first time is computed based on a current time, when the time of MBMS data transfer is not available.

In some embodiments, the processor 905 is further configured to start the MBMS session at the first time. In some embodiments, the processor 905 is further configured to check whether the MBMS session is the last MBMS session or not. In some embodiments, the processor 905 is further configured, based on the computed first time, compute a second time for a cleanup of the MBMS session. The second time is a second MCCH update time. In some embodiments, the second time is computed based on the first time and based on a time of MBMS data stop. In some embodiments, the second time is computed based on the first time and based on a current time. In some embodiments, the second time is computed based on the first time and based on a time of MBMS data transfer and based on a MBMS session duration time.

The eNB 401 comprises a transmitter 907 configured to periodically send, from the first time, the configuration information to the user equipment 405. The transmitter 907 stops the sending of the configuration information to the user equipment 405 when the MBMS session is the last MBMS session. The transmitter 907 sends updated configuration information to the user equipment 405 if the MBMS session is not the last MBMS session. The updated configuration information is updated MBSFN area configuration information. In some embodiments, the transmitter 907 is configured to stop the sending of the configuration information at the computed second time.

The present mechanism for handling configuration information may be implemented through one or more processors, such as the processor 905 in the eNB arrangement depicted in FIG. 9, together with computer program code for performing the functions of the embodiments herein. The processor may be for example a Digital Signal Processor (DSP), Application Specific Integrated Circuit (ASIC) processor, Field Programmable Gate Array (FPGA) processor or microprocessor. The program code mentioned above may also be provided as a computer program product, for instance in the form of a data carrier carrying computer program code for performing the embodiments herein when being loaded into the eNB 401. One such carrier may be in the form of a CD ROM disc. It is however feasible with other data carriers such as a memory stick. The computer program code may furthermore be provided as pure program code on a server and downloaded to the eNB 401.

The eNB 401 may further comprise a memory 910 comprising one or more memory units. The memory 910 is arranged to be used to store data, received data streams, MBMS session start requests, duration time, parameters, first time, second time, configuration information, updated configuration information, threshold values, time periods, configurations, schedulings, and applications to perform the methods herein when being executed in the eNB 401.

Those skilled in the art will also appreciate that the receiver 901 and the transmitter 907 described above may refer to a combination of analog and digital circuits, and/or one or more processors configured with software and/or firmware, e.g. stored in a memory, that when executed by the one or more processors such as the processor 905 perform as described above. One or more of these processors, as well as the other digital hardware, may be included in a single ASIC, or several processors and various digital hardware may be distributed among several separate components, whether individually packaged or assembled into a System-on-a-Chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in an evolved NodeB, eNB, for handling configuration information, which configuration information is a Multimedia Broadcast Multicast Service, MBMS, Single Frequency Network, MBSFN, area configuration information, the method comprising:
   receiving, from a Mobility Management Entity, MME, a MBMS session start request;
   based on the received request, computing a first time for a start of the MBMS session, wherein the first time is a first Multicast Control CHannel, MCCH, update time;
   periodically sending, from the first time, the configuration information to a user equipment;
   stopping the sending of the configuration information to the user equipment when the MBMS session is a last MBMS session; and
   sending updated configuration information to the user equipment when the MBMS session is not the last MBMS session, wherein the updated configuration information is updated MBSFN area configuration information.

2. The method according to claim 1, wherein the MBMS session start request comprises information about a time of MBMS data transfer, and wherein the first time is computed based on the time of MBMS data transfer.

3. The method according to claim 1, wherein the first time is computed based on a current time.

4. The method according to claim 1, further comprising: starting the MBMS session at the first time.

5. The method according to claim 1, further comprising: checking whether the MBMS session is the last MBMS session or not.

6. The method according to claim 1, further comprising: based on the computed first time, computing a second time for a cleanup of the MBMS session, which second time is a second MCCH update time; and
   wherein the sending of the configuration information is stopped at the computed second time.

7. The method according to claim 6, wherein the second time is computed based on the first time and based on a time of MBMS data stop.

8. The method according to claim 6, wherein the second time is computed based on the first time and based on a current time.

9. The method according to claim 6, wherein the second time is computed based on the first time and based on a time of MBMS data transfer and based on a MBMS session duration time.

10. The method according to claim 1, wherein the MBMS session start request is a first MBMS session start request.

11. The method according to claim 1, wherein the MBMS session is an enhanced MBMS, eMBMS, session.

12. The method according to claim 1, wherein the eNB comprises a Multi-Cell Multicast Coordination Entity, MCE, which MCE performs the method in claim 1.

13. An evolved NodeB, eNB, for handling configuration information, which configuration information is a Multimedia Broadcast Multicast Service, MBMS, Single Frequency Network, MBSFN, area configuration information, the eNB (401) comprises:
   a receiver configured to receive, from a Mobility Management Entity, MME, a MBMS session start request;
   a processor configured to, based on the received request, compute a first time for a start of the MBMS session, wherein the first time is a first Multicast Control CHannel, MCCH, update time;
   a transmitter configured to:
      periodically send, from the first time, the configuration information to a user equipment;

stop the sending of the configuration information to the user equipment when the MBMS session is a last MBMS session; and to send updated configuration information to the user equipment when the MBMS session is not the last MBMS session, wherein the updated configuration information is updated MBSFN area configuration information.

14. The eNB according to claim 13, wherein the MBMS session start request comprises information about a time of MBMS data transfer, and wherein the first time is computed based on the time of MBMS data transfer.

15. The eNB according to claim 14, wherein the first time is computed based on a current time.

16. The eNB according to claim 13, wherein the processor is further configured to start the MBMS session at the first time.

17. The eNB according to claim 13, wherein the processor is further configured to check whether the MBMS session is the last MBMS session or not.

18. The eNB according to claim 13, wherein the processor is further configured based on the computed first time, compute a second time for a cleanup of the MBMS session, which second time is a second MCCH update time; and wherein the transmitter is configured to stop the sending of the configuration information at the computed second time.

19. The eNB according to claim 18, wherein the second time is computed based on the first time and based on a time of MBMS data stop.

20. The eNB according to claim 18, wherein the second time is computed based on the first time and based on a current time.

21. The eNB according to claim 18, wherein the second time is computed based on the first time and based on a time of MBMS data transfer and based on a MBMS session duration time.

22. The eNB according to claim 13, wherein the MBMS session start request is a first MBMS session start request.

23. The eNB according to claim 13, wherein the MBMS session is an enhanced MBMS, eMBMS, session.

24. The eNB according to claim 13, wherein the eNB comprises a Multi-Cell Multicast Coordination Entity, MCE, which MCE comprises the features of the eNB according to claim 13.

* * * * *